US012798476B2

(12) United States Patent
Hohmann et al.

(10) Patent No.: US 12,798,476 B2
(45) Date of Patent: Nov. 17, 2026

(54) COMMUNICATION DEVICE FOR VEHICLES

(71) Applicant: HELLA GMBH & CO. KGAA, Lippstadt (DE)

(72) Inventors: Carsten Hohmann, Warstein (DE); Christopher Reike, Paderborn (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/312,949

(22) Filed: Aug. 28, 2025

(65) Prior Publication Data

US 2026/0061932 A1 Mar. 5, 2026

(30) Foreign Application Priority Data

Sep. 5, 2024 (DE) ........................ 102024125441.6

(51) Int. Cl.
*B60Q 1/50* (2006.01)
*B60Q 1/00* (2006.01)
(Continued)

(52) U.S. Cl.
CPC ......... *B60Q 1/5037* (2022.05); *B60Q 1/0041* (2013.01); *B60Q 1/2696* (2013.01); (Continued)

(58) Field of Classification Search
CPC ........ F21S 41/148; F21S 41/151; F21S 43/14; F21S 43/50; F21S 43/265; F21Y 2103/10; (Continued)

(56) References Cited

U.S. PATENT DOCUMENTS 4,383,290 A * 5/1983 Binder .................. F21S 43/255 362/291
2023/0143148 A1 5/2023 Mugge

FOREIGN PATENT DOCUMENTS

DE 2837635 A1 4/1980
DE 102005041682 A1 3/2007
(Continued)

OTHER PUBLICATIONS

English translation of EP 3342641 A1 (Year: 2018).*
(Continued)

*Primary Examiner* — Omar Rojas Cadima
(74) *Attorney, Agent, or Firm* — WARNER NORCROSS + JUDD LLP

(57) ABSTRACT

A communication device for vehicles having of light sources and control means for generating light patterns or light animations directed at individual road users. The light sources are arranged on a common planar carrier in a matrix-like manner and can be controlled individually. An environment sensor unit is provided for detecting road users. A control unit is provided for controlling the light sources, depending on the detected road user, such that a light pattern visualizing the current driving state of the vehicle or a light animation is generated. A cover having a plurality of lamellar struts and strip-shaped passages is connected to the light module on the light emission side, by which a first part of the light generated by the light module is transmitted through the strip-shaped passages and a second part of the light generated by the light module is not transmitted by means of the lamellar struts.

14 Claims, 2 Drawing Sheets

(51) Int. Cl.

| | |
|---|---|
| ***B60Q 1/26*** | (2006.01) |
| ***F21S 43/14*** | (2018.01) |
| ***F21S 43/20*** | (2018.01) |
| *G08G 1/005* | (2006.01) |

(52) U.S. Cl.

CPC ............. *F21S 43/14* (2018.01); *F21S 43/265* (2024.05); *G08G 1/005* (2013.01)

(58) Field of Classification Search

CPC . F21Y 2115/10; B60Q 1/247; B60Q 2400/40; B60Q 2400/50; B60Q 1/0041; B60Q 1/5035; B60Q 1/5037; B60Q 1/543; B60Q 1/547; F21W 2103/60; G08G 1/005

See application file for complete search history.

(56) References Cited

FOREIGN PATENT DOCUMENTS

| | | | | | |
|---|---|---|---|---|---|
| DE | 102010032190 | A1 | | 6/2012 | |
| DE | 102017111322 | A1 | | 11/2018 | |
| DE | 102018206040 | A1 | | 10/2019 | |
| DE | 102018123884 | A1 | * | 2/2020 | ............ H10W 90/00 |
| DE | 102018213563 | A1 | * | 2/2020 | .............. F21S 43/31 |
| EP | 0122683 | A1 | * | 10/1984 | .............. F21S 43/50 |
| EP | 3342641 | A1 | * | 7/2018 | ............... G03H 1/26 |
| EP | 3812210 | A1 | | 4/2021 | |
| EP | 3640089 | A1 | | 4/2023 | |

OTHER PUBLICATIONS

English translation of DE 102018123884 A1 (Year: 2020).*
English translation of EP 0122683 A1 (Year: 1984).*
Englsih translation of DE 102018213563 A1 (Year: 2020).*

* cited by examiner

COMMUNICATION DEVICE FOR VEHICLES

CROSS-REFERENCE TO RELATED APPLICATIONS

The present application claims the benefit of German Patent Application No. 10-2024-125-441.6, filed Sep. 5, 2024, the disclosure of which is incorporated by reference.

FIELD OF THE INVENTION

The invention relates to a communication device for vehicles.

BACKGROUND OF THE INVENTION

A communication device for vehicles is known from DE 10-2017-111-322A1, which has a plurality of light sources oriented in different directions. The communication device is arranged in a lateral region of the vehicle, for example on an A-pillar or a B-pillar of the vehicle, and can emit light signals to road users located in the environment of the vehicle in order to signal information about the status of the vehicle or the planned movement of the vehicle. A liquid crystal (LC) display is arranged in front of the light sources in the direction of light emission, by means of which the light emitted by the light sources can be allowed to pass through or blocked. Thus, the LC display serves as an aperture to emit differently shaped or colored light signals in certain directions. The disadvantage of the known communication device is that it is relatively expensive.

DE 10-2021-128-935A1 discloses a lighting device for generating a direction indicator, which has a light source, a light guide and an LC display arranged on a light output side thereof. The LC display has a number of individually controllable pixels arranged in a matrix so that different light patterns can be generated. When the LC display is not in operation, it has a black surface, giving the lighting device a dark appearance.

A communication device for vehicles is known from EP 3640089A1, which provides a plurality of light sources arranged in strips. This can be used to form a light ring that runs horizontally around the vehicle, which appears in different colors and thus sends different light signals to road users located in the environment of the vehicle. A disadvantage of the known device is that a large number of light sources are required if the information content of the light signals is to be increased.

A lighting device for vehicles is known from EP 3812210A1, which comprises a plurality of light sources arranged in a matrix-like manner, wherein each light source can emit light in a different color. The light sources are arranged on a planar carrier so that a large number of pixels are formed, which can be used to generate different signal light functions, such as tail lights, brake lights or daytime running lights, and communication light functions in the form of light patterns or light animations, depending on the control. A disadvantage of the known device is that the appearance of the communication device is characterized by the individual light sources.

SUMMARY OF THE INVENTION

The object of the present invention is to further develop a communication device for vehicles in such a way that a large number of different light patterns or light animations can be generated in a cost-effective manner, wherein an attractive appearance of the communication device is ensured when it is not in operation.

To achieve this object, the invention has the features of the current embodiments.

The particular advantage of the invention is that by covering a light source field by means of a cover consisting of a plurality of lamellar struts and strip-shaped passages extending between them, on the one hand, a desired light pattern or a desired light animation can be generated in an operating state of the communication device, and, on the other hand, when the communication device is not in operation, it has an attractive, preferably dark appearance.

According to a further development of the invention, the cover is designed as a cover film, wherein the lamellar struts are preferably polymeric microstructure elements surrounded by a transparent, translucent material. This keeps the costs relatively low.

According to a further development of the invention, a length of the lamellar struts extending transversely to the plane of extension of the cover film is more than 1.5 times greater than a width of the lamellar struts extending in the plane of extension. This has the advantage of reducing ambient radiation from the sun to such an extent that the cover film appears as a dark film when the light sources are switched off.

According to a further development of the invention, a distance between adjacent lamellar struts is smaller than a width of the lamellar struts. This ensures that there is sufficient glare control of the ambient light so that the communication device has a dark appearance when not in operation.

According to a further development of the invention, the lamellar struts extend in a horizontal direction in the installation position of the communication device, so that the desired glare control of the ambient light is ensured.

According to a further development of the invention, the lamellar strut has a first lateral surface and a second lateral surface which converge in the direction of light emission to form a free end. The first lateral surface arranged at the top in the installation position is inclined to a horizontal plane, resulting in an increased opening angle for the passage, which increases the light yield.

According to a further development of the invention, the control unit has a light pattern routine so that a light pattern is generated and/or changed as a function of a movement state of the road user and/or as a function of a driving state of the vehicle. This is an advantageous way of signaling to a pedestrian as a road user, for example, whether the vehicle has detected him or her and that the vehicle is being brought to a stop so that the pedestrian can cross the road. Such a signaling function is particularly helpful for semi-autonomous or autonomous vehicles.

According to a further development of the invention, the control unit can comprise a light animation routine so that, in contrast to a static light pattern, dynamically changed light animations can be generated. This has the advantage of making the signaling effect and the transmission of information more convenient and clearer.

According to a further development of the invention, the communication device is arranged in a front region of the vehicle away from a headlight. Advantageously, the communication device forms a separate unit that is used exclusively for transmitting signaling messages to another road user.

Further advantages of the invention result from the embodiments of the present disclosure.

BRIEF DESCRIPTION OF THE DRAWINGS

Exemplary embodiments of the invention are explained in more detail below with reference to the drawings. In the figures.

DETAILED DESCRIPTION OF THE CURRENT EMBODIMENT

Figure 1:
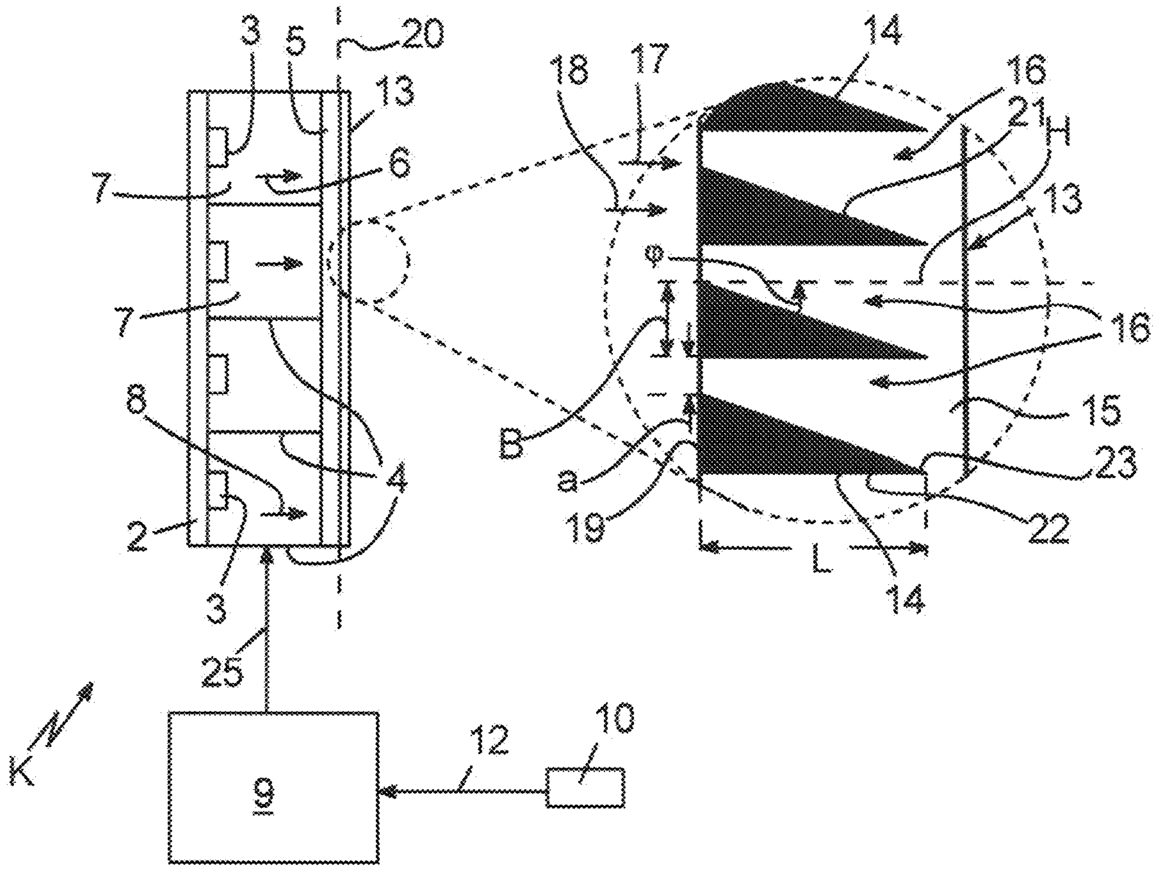
FIG. 1 is a schematic side view of a communication device in accordance with an embodiment of the invention.
Figure 2:
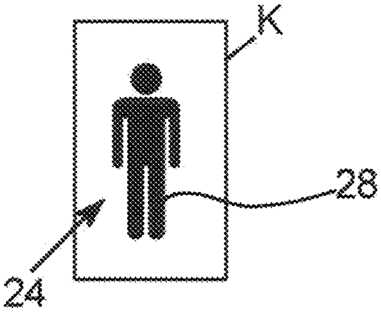
FIG. 2 is a front view of the communication device outputting a first light pattern.
Figure 3:
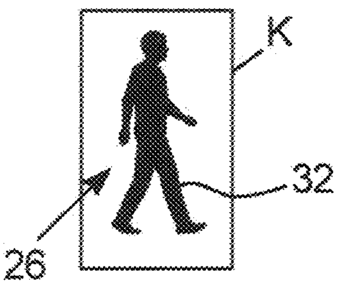
FIG. 3 is a front view of the communication device outputting a second light pattern.

A communication device K for vehicles F according to the invention can be installed as a structural unit, for example in semi-autonomous or autonomous vehicles F, for generating light pattern signals or light animation signals which are directed to an individual road user, for example a pedestrian, in order to inform him or her of the current driving status of the vehicle F provided with the communication device K. The communication device K can, for example, be arranged in a front region of the vehicle F between the headlights 1 of the vehicle F.

Alternatively or additionally, the communication device K can also be arranged in a lateral region or on a rear side of the vehicle F.

The communication device K comprises a planar carrier 2, which is preferably designed as a printed circuit board. A number of light sources 3 are arranged in a matrix-like manner on the carrier 2. The light sources 3 are preferably designed as LED light sources. Partition walls 4 rise up laterally from the light sources 3, so that each light source 3 is surrounded by partition walls 4. Free ends of the partition walls 4 are covered by a transparent pane 5. In the present exemplary embodiment, the transparent pane 4 is offset parallel to the carrier 2 in the light emission direction 6 of the communication device K. The carrier 2, the transparent pane 5 and the partitions 4 form a number of light chambers 7 that corresponds to the number of light sources 3. This ensures that there can be no overlap or intersection of the light 8 emitted by the light sources 3. The partition walls 4 may, for example, have reflective surfaces.

Furthermore, the communication device K comprises a control unit 9 for controlling the light sources 3. The light sources 3 can be controlled individually.

An environment sensor unit 10 is provided for detecting road users in an environment 11 of the vehicle F. For this purpose, the environment sensor unit 10 may, for example, comprise a camera.

The control unit 9 preferably contains an evaluation routine for evaluating the sensor data 12 sent by the environment sensor unit 10. In this way, the current location of the road user relative to the vehicle F can be determined at any time.

A cover film 13 is applied to the light-emitting side of the transparent pane 5 as a cover, in which a plurality of lamellar struts 14 is arranged. The lamellar struts 14 are surrounded by a polymeric transparent surrounding material 15.

The lamellar struts 14 are elongated and extend from one edge of the cover film 13 to an opposite edge thereof. The lamellar struts 14 are of identical design. The lamellar struts 14 each have a width B. They are arranged at a distance from one another, wherein adjacent lamellar struts 14 are arranged at a distance a from one another. A strip-shaped passage 16 is thus formed between the adjacent lamellar struts 14, through which a first part 17 of the light 8 emerging from the light chambers 7 passes. A second part 18 of the light 8 emerging hits a wide front face 19 of the lamellar struts 14 arranged on the light entry side of the cover film 13 and is absorbed thereby.

The lamellar struts 14 have the width B on the light entry side, wherein the front faces 19 arranged on the light entry side extend in a plane of extension 20 of the cover film 13. The lamellar struts 14 each have a length L running transversely to the plane of extension 20 of the cover film 13. A quotient of the length L and the width B of the lamellar struts 14 is preferably greater than 1.5.

In the present exemplary embodiment, the aperture a is smaller than the width B of the lamellar struts 14. The ratio between the distance a and the width B of the lamellar struts 14 can be 1 to 2, for example, so that a light transmission of approx. 30% is achieved.

The lamellar struts 14 are designed as microstructure elements and have dimensions in the nanometer or micrometer range. The length L of the lamellar struts 14 can be in a range between 150 nm and 10 μm.

In the present exemplary embodiment, the lamellar struts 14 extend in a straight line. The cover film 13 is applied to the transparent pane 5 in such a way that the lamellar struts 14 extend in a horizontal direction in the installation position of the communication device K.

As can be seen from FIG. 1, the lamellar struts 14 each have a first lateral surface 21 and a second lateral surface 22, each of which tapers from the front face 19 in the direction of light emission 6. In the present exemplary embodiment, the first lateral surface 21 and the second lateral surface 22 of the lamellar struts 14 taper to a tip 23 at the free end.

In the installation position of the communication device K, the first lateral surface 21 is arranged on an upper side of the lamellar struts 14. This upper lateral surface 21 is inclined at an acute angle φ with respect to a horizontal plane H. The second lateral surface 22 is arranged as a lower lateral surface in the installation position extending horizontally. The lamellar struts 14 thus form a sawtooth-shaped microstructure.

According to an alternative embodiment not shown, the lamellar struts may also be symmetrical. A free end can also be flattened to form a font face that runs parallel to the front face 19.

In the operating state of the communication device K, i.e. when the light sources 3 are switched on, the cover film 13 allows partial transmission of the light 8 emitted by the light sources 3 through the passages a. Furthermore, when the communication device K is not in operation, i.e. when the light sources 3 are switched off, the cover film 13 gives a dark appearance. Control is directed exclusively at the light sources 3.

The control unit 9 has a light pattern routine so that a light pattern is generated and/or changed depending on a movement state of the road user located in the environment 11 and/or depending on a driving state of the vehicle F. If, for example, the pedestrian is standing at a crosswalk which the vehicle F is approaching, a first light pattern signal 24 can be generated by controlling the light sources 3 by means of a control signal 25, which signals the pedestrian to stop, if possible, by displaying a standing man 28 until the vehicle F has reached its stopping position. As soon as the vehicle F has reached the stop position in front of the crosswalk, the control unit 9 generates such a control signal 25 that a second light pattern signal 26 with a walking man 32 is generated and displayed. Pedestrians are now signaled that they can cross the crosswalk. In the case of colored light sources 3, for example, the first light pattern signal 24 *e* can indicate a standing man in red light color and the second light pattern signal 26 can indicate a walking man in green light color.

In this way, the current driving status of the vehicle or instructions in relation to the vehicle F are visualized to the road user in the environment 11.

Figure 4:
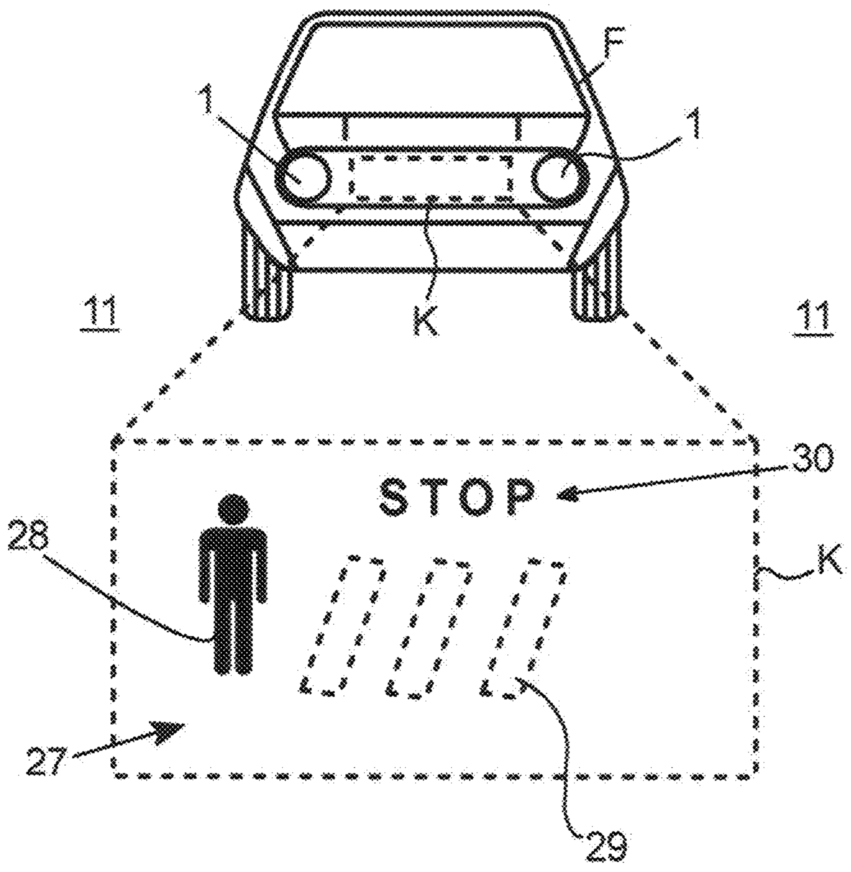
FIG. 4 is a front view of the communication device outputting a first light animation.
Figure 5:
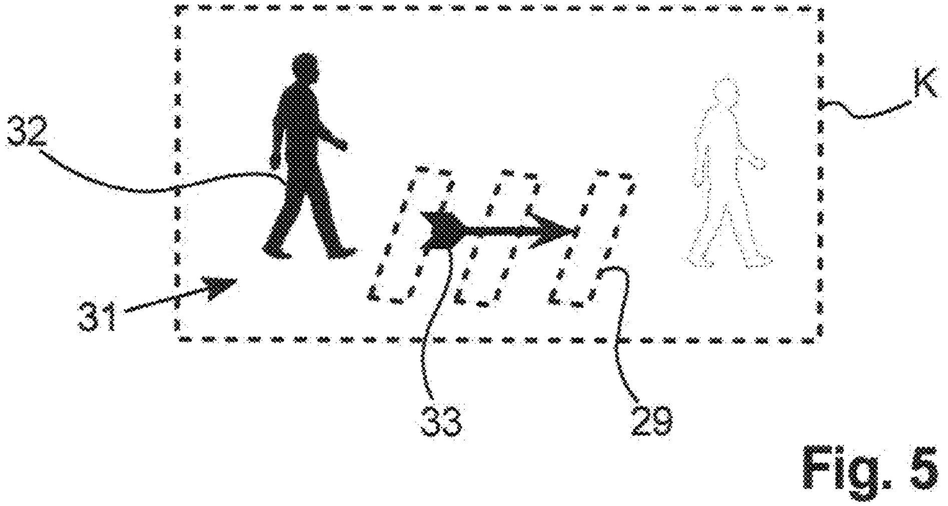
FIG. 5 is a front view of the communication device outputting a second light animation.

According to a further embodiment of the invention as shown in FIGS. 4 and 5, the control unit 9 may have a light animation routine, so that light animations are generated and/or changed as a function of a movement state of the road user located in the environment 11 and/or as a function of the driving state of the vehicle F.

If the pedestrian at the edge of the lane at the level of the crosswalk is to be signaled to wait until the vehicle F has reached the stop position, a first light animation signal 27 can be generated as shown in FIG. 4, for example. The first light animation signal 27 visualizes the standing man 28 and a crosswalk 29. In addition, the instruction "STOP" 30 makes it clear to road users that they should stop. Only when the vehicle F has reached the stop position in front of the crosswalk is a second light animation signal 31 generated, which shows the walking man 32, the crosswalk 29 and an arrow 33 to signal to the road user that he or she can now cross the road onto the crosswalk. This conveniently creates a dynamically changing light animation.

According to an embodiment of the invention not shown, other light patterns or light animations can also be generated in order to enable interaction between the vehicle F and the road user located in the environment 11 of the vehicle F.

LIST OF REFERENCE NUMBERS

1 headlamp
2 carrier
3 light source
4 partition wall
5 pane
6 light emission direction
7 light chamber
8 light
9 control unit
10 environment sensor unit
11 environment
12 sensor data
13 cover film
14 strut
15 surrounding material
16 passage
17 first part
18 second part
19 front face
20 plane of extension
21 first lateral surface
22 second lateral surface
23 tip
24 first light pattern signal
25 control signal
26 second light pattern signal
27 first light animation signal
28 standing man
29 crosswalk
30 instruction
31 second light animation signal
32 walking man
33 arrow
a distance
B width
L length
F vehicle
H horizontal
K communication device The above description is that of a current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A communication device for a vehicle comprising:
a light module comprising a plurality of light sources arranged on a common planar carrier and controllable individually;
partition walls that extend from the common planar carrier in a grid to define a plurality of light chambers for the plurality of light sources;
an environment sensor unit configured to detect road users in an environment of the vehicle;
a control unit configured to control the plurality of light sources to generate, depending on the detection of a road user in the environment of the vehicle, a light pattern visualizing a current driving state of the vehicle; and
a cover film extending over the plurality of light chambers, wherein for each of the plurality of light chambers the cover film includes a plurality of lamellar struts between adjacent partition walls, each of the plurality of lamellar struts being separated from one another by strip-shaped passages, the plurality of lamellar struts including first and second lateral surfaces that converge toward each other in a light-propagating direction to define a tapered end, wherein the cover film is connected to the light module on a light emission side of the light module,
wherein, for each of the plurality of light chambers, a first part of the light generated by the light module is transmitted through the strip-shaped passages and a second part of the light generated by the light module hits the lamellar struts and is not transmitted through the cover film.

2. The communication device according to claim 1, wherein the lamellar struts are microstructure elements which are surrounded by a transparent surrounding material.

3. The communication device according to claim 2, wherein the lamellar struts have a length extending transversely to a plane of extension of the cover film and a width extending in the plane of extension of the cover film, wherein a ratio of the length to the width is greater than 1.5.

4. The communication device according to claim 3, wherein a distance between adjacent lamellar struts is smaller than the width of the lamellar struts.

5. The communication device according to claim 3, wherein the lamellar struts extend continuously and in a straight line along the plane of extension of the cover film, wherein the cover film is fastened to the light module such that the lamellar struts extend in a horizontal direction in an installation position of the communication device.

6. A vehicle comprising the communication device of claim 1, wherein the communication device is arranged in a front region of the vehicle remote from a headlight thereof.

7. The communication device according to claim 1, wherein the first lateral surface of the lamellar struts is designed as an upper lateral surface in an installation position of the communication device, which extends inclined to a horizontal plane by an acute angle in the direction of the tapered end of the lamellar strut.

8. The communication device according to claim 1, wherein the light module comprises a transparent pane and the cover film is applied to the transparent pane of the light module.

9. The communication device according to claim 8, wherein the light sources of the light module comprise a plurality of LED light sources, the planar carrier comprises a printed circuit board, and the partition walls comprise a plurality of opaque partition walls that rise up from the printed circuit board, wherein free ends of the plurality of opaque partition walls are covered by the transparent pane, and wherein one of the plurality of LED light sources is arranged in each of the plurality of light chambers.

10. The communication device according to claim 1, wherein the light pattern is a static light pattern and the control unit has a light pattern routine in which light pattern signals are at least one of:

generated as a function of a movement state of the road user located in the environment;

changed as a function of a movement state of the road user located in the environment;

generated as a function of a driving state of the vehicle; and changed as a function of a driving state of the vehicle.

11. The communication device according to claim 10, wherein the light pattern routine is configured such that the light pattern at least one of:

generates its shape as a function of the movement state of the road user located in the environment;

changes its shape as a function of the movement state of the road user located in the environment;

generates its color as a function of the movement state of the road user located in the environment;

changes its color as a function of the movement state of the road user located in the environment;

generates its shape as a function of the driving state of the vehicle;

changes its shape as a function of the driving state of the vehicle;

generates its color as a function of the driving state of the vehicle; and changes its color as a function of the driving state of the vehicle.

12. The communication device according to claim 1, wherein the light pattern is a light animation and the control unit has a light animation routine in which dynamically variable light animation signals are at least one of:

generated as a function of a movement state of the road user located in the environment;

changed as a function of a movement state of the road user located in the environment;

generated as a function of a driving state of the vehicle; and changed as a function of a driving state of the vehicle.

13. The communication device according to claim 1, wherein the light pattern is one of a static light pattern and a light animation.

14. The communication device according to claim 1, wherein a length of the lamellar struts is in a range between 150 nm and 10 μm.

* * * * *